United States Patent
Burgdorf et al.

[11] Patent Number: 5,454,632
[45] Date of Patent: Oct. 3, 1995

[54] BRAKE SYSTEM WITH PUMP POWER CONSUMPTION CONTROL

[75] Inventors: Jochen Burgdorf, Offenbach-Rumpenheim; Wieland Kuhn, Bad Nauheim, both of Germany

[73] Assignee: Alfred Teves GmbH, Frankfurt, Germany

[21] Appl. No.: 122,475

[22] PCT Filed: Feb. 10, 1992

[86] PCT No.: PCT/EP92/00280

§ 371 Date: Sep. 24, 1993

§ 102(e) Date: Sep. 24, 1993

[87] PCT Pub. No.: WO92/17355

PCT Pub. Date: Oct. 15, 1992

[30] Foreign Application Priority Data

Mar. 30, 1991 [DE] Germany .......................... 41 10 494.3

[51] Int. Cl.[6] .............. B60T 8/40; B60T 8/48; B60T 8/94
[52] U.S. Cl. .................. 303/115.4; 303/11; 303/122.05
[58] Field of Search ................. 303/10, 11, 92, 303/95, 113.2, 113.3, 115.2, 115.4, 115.5, 116.4, 20, DIG. 4; 417/22, 24, 42

[56] References Cited

U.S. PATENT DOCUMENTS

| 4,728,156 | 3/1988 | Burgdorf et al. | 303/92 |
|---|---|---|---|
| 4,892,364 | 1/1990 | Burgdorf | 303/116.1 |
| 5,000,520 | 3/1991 | Schmitt | 303/10 |

FOREIGN PATENT DOCUMENTS

| 3241039 | 5/1984 | Germany . | |
|---|---|---|---|
| 3505410 | 8/1986 | Germany . | |
| 3813174 | 11/1989 | Germany . | |
| 3813172 | 11/1989 | Germany . | |
| 61-150858 | 9/1986 | Japan . | |
| 62-258842 | 11/1987 | Japan . | |
| 5185928 | 7/1993 | Japan | 303/116.4 |
| 2194010 | 2/1988 | United Kingdom . | |
| 2197402 | 5/1988 | United Kingdom . | |
| 90/02066 | 3/1990 | WIPO . | |
| 9300238 | 1/1993 | WIPO | 303/DIG. 4 |

*Primary Examiner*—Josie A. Ballato
*Attorney, Agent, or Firm*—Ratner & Prestia

[57] ABSTRACT

A hydraulic brake system with anti-lock control and traction slip control has an electric-motor-driven hydraulic pump 6 and a motor 7 for auxiliary pressure supply during a controlled braking operation and during a traction slip control operation by way of brake management. During a traction slip control operation the speed of the hydraulic pump is reduced by way of a reduction in the power consumption of the drive motor of the pump down to a predetermined value where the speed and the noise development are low relative to values with nominal capacity. The power limitation will be cancelled in situations critical to safety and reliability or in case of certain malfunctions of the control system. The power limitation is achieved by way of relays and an ohmic series resistor or by way of a so-called semiconductor relay or electronic relay.

25 Claims, 1 Drawing Sheet

5,454,632

1

BRAKE SYSTEM WITH PUMP POWER CONSUMPTION CONTROL

BACKGROUND OF THE INVENTION

The present invention relates to a hydraulic brake system having: (1) anti-lock control and/or traction slip control, (2) an electric-motor-driven hydraulic pump for auxiliary pressure supply during a controlled braking operation and during a traction slip control operation by means of brake management, and (3) an electronic control unit for controlling the auxiliary pressure and for modulating or controlling the braking pressure in the wheel brakes of the controlled wheels in dependence on the rotational behavior of the wheels and/or on signals representing the proper operation of the brake system and of the electronic elements or pointing out malfunctions.

Hydraulic brake systems that are known and provided with electronic anti-lock control and traction slip control are equipped with a one-circuit or multi-circuit hydraulic pump for auxiliary pressure supply. Usually, electric-motor-driven pumps are used that are turned on by the associated electronic control unit upon the onset of control. The hydraulic energy consumption varies very much depending on the control operation and control phase. The nominal capacity of the motor-and-pump unit, of course, is arranged to handle the maximum demand that may appear in certain situations during an anti-lock control operation. As regards traction slip control by means of brake management, where the pump is to deliver the pressure for the application of the brake, less energy and less hydraulic pressure, in principle, are needed as compared with anti-lock control. For cost reasons, the same unit is used for anti-lock control and traction slip control, although a smaller, less potential motor-and-pump unit would be sufficient for traction slip control.

The noise developed upon the onset of control and caused by the turning-on or rather by the operation of the hydraulic pump, however, is felt as a disturbance, namely a reduction in driving comfort, during a traction slip control operation.

SUMMARY OF THE INVENTION

Therefore, it is an objective of the present invention to reduce decisively these troublesome noises in a simple manner incurring as little expenditure as possible. In achieving this aim, however, operational reliability is not to be reduced even in unfavorable situations.

It has been found that this object is achieved by arranging a brake system of the type referred to above, so that during a traction slip control operation, the speed of the hydraulic pump or rather of the pump motor is reduced by limiting the power consumption of the drive motor to a predetermined value where the speed and the noise development are small relative to the noise development with nominal capacity. In addition, the control unit will cancel the power limitation in situations critical to safety and reliability or in case of certain malfunctions of the control system. The speed limitation is expediently controlled by the electronic control unit or by additional circuitry.

In accordance with the present invention, there is, thus, a limitation of the current consumption and, hence, of the power consumption of the drive motor of the hydraulic pump in case of a traction slip control operation, thereby considerably reducing the mainly motor-speed-dependent noise development to a level which no longer will be felt to be troublesome or, at most, minimally so. In practice, a speed of 40% to 60% of the nominal speed is sufficient

2 during traction slip control. In situations critical to safety and reliability, such as in case of insufficient supply voltage, extreme outside temperatures etc., the power limitation is cancelled. Consequently, noise reduction is achieved without any losses as regards the safety and reliability of the controlled brake system.

In accordance with an advantageous embodiment of the present invention, which is characterized by particularly low manufacturing expenditure, an ohmic resistor is inserted into the electric attachment of the pump motor in order to limit the power consumption, with the ohmic resistor being bridged by the contact of a relay, controlled by the electronic control unit, in case of full power consumption.

Also in accordance with the present invention, instead of the ohmic resistor, it is possible to use a controllable resistor, such as a semiconductor relay, switching transistor or the like, which is actuatable by means of an electronic-control-unit-generated pulse sequence in order to limit the power consumption of the hydraulic pump or rather the power consumption of the motor-and-pump unit. If actuated by a permanent signal, the intrinsic impedance of such a controllable resistor will become so small as to be negligible.

In the last-mentioned embodiment, it is also possible to adapt the power consumption of respectively the hydraulic pump and electric motor exactly to the respective demand by means of modulating the pulse sequence serving to actuate the variable resistor.

Further, in accordance with another embodiment of the present invention, upon the onset of control, the motor of the hydraulic pump, at first, is actuated with full power and that, only after a predetermined period, such as of 100 msec to 500 msec, the power consumption of the electric motor is limited to a sufficient extent to ensure that the motor will run at a reduced speed and will produce but a low noise.

Further characteristics, advantages and applications of the present invention will become evident from the following description of further details, reference being made to the accompanying drawing which, by way of a diagram of the fundamental principles, represents the main components of an inventive brake system which are necessary for understanding this invention.

DETAILED DESCRIPTION OF THE INVENTION

Figures 1, 1A:
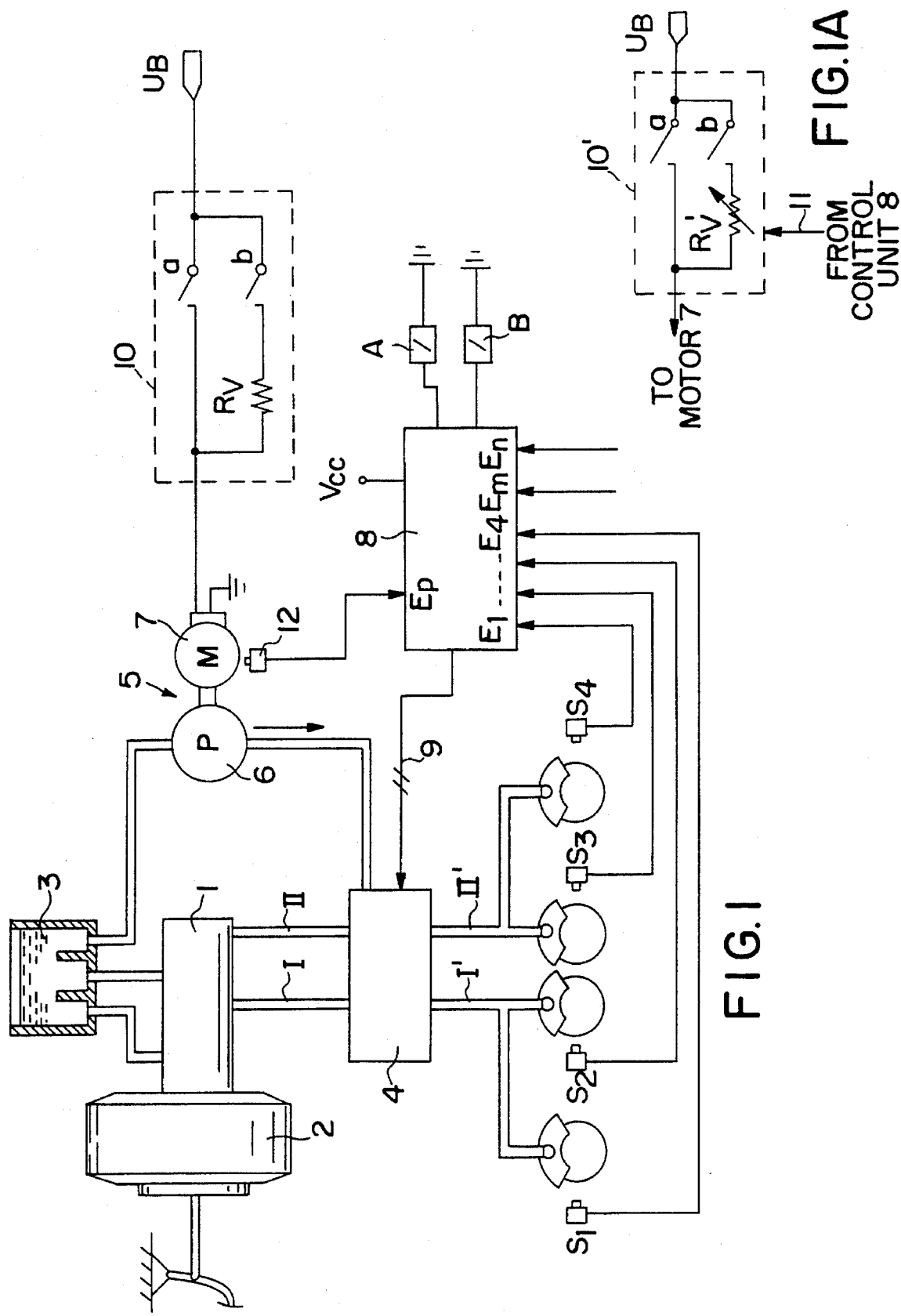
FIG. 1 illustrates a preferred embodiment of the present invention.
FIG. 1A represents alternative arrangements of the power limiting means.

Referring to the drawing, a brake system, having anti-lock control and traction slip control in accordance with the present invention, includes a master cylinder 1, a brake booster 2, a pressure compensation and storage reservoir 3 and a braking pressure modulator 4. Moreover, there is a motor-and-pump unit 5 composed of a hydraulic pump 6 and an electric drive motor 7 for auxiliary pressure generation. As there are two hydraulically separated brake circuits I, I', II, II' to which two vehicle wheels, at a time, are connected, it is possible to use a hydraulic pump with two hydraulically separated circuits instead of pump 6. Brake systems of this type are generally known and are, therefore, not illustrated here.

An electronic control unit 8 also is included in a brake system constructed in accordance with the present invention. This electronic control unit 8 serves to evaluate the information about the rotational behavior of the wheels contained in signals developed by wheel sensors $S_1$ through $S_4$ and to generate braking pressure control signals. The braking pressure control signals are supplied to the braking pressure modulator 4 via lines represented by a multiple line 9. These control signals serve to control solenoid valves which, depending on the control phase, keep the pressure in the wheel brakes constant, reduce the pressure and reincrease the pressure. In case of traction slip control, at first, the pressure medium path from the wheel brakes to the master cylinder 1 will be locked by means of such solenoid valves. Subsequently, by means of the hydraulic pump 6, the desired brake management will be performed in order to stabilize the spinning wheels. $V_{CC}$ represents the attachment of the power supply to the electronic control elements.

In the illustrated FIG. 1 embodiment of the present invention, characterized by particularly low manufacturing expenditure, the power limitation during a traction slip control operation is achieved by an ohmic series resistor $R_V$. To this end, the switching contacts a and b of two relays A, B, respectively, are inserted into the electric connection path of the electric motor 7, i.e., in the path to the battery or voltage source $U_B$. The two relays A, B are directly controlled by the electronic control unit 8. Relay A is the actual motor relay, so that the motor 7 of the motor-and-pump unit 5 can be turned on and off via the switching contact of this relay.

In case of an anti-lock control operation, possibly in dependence on the actual auxiliary hydraulic energy demand, motor relay A will be actuated. It is of no importance whether the switching contact b of auxiliary relay B will likewise become closed or will stay open in this phase.

During a traction slip control operation, however, according to the present invention, only auxiliary relay B will be actuated. The series resistor $R_V$ in the connection path from the battery $U_B$ to the electric motor 7 of the pump 6 will limit the power consumption of this electric motor 7 and its speed to 40% to 60%, for example, of the nominal speed. The switching contact a of the motor relay A will stay open.

Upon the onset of a traction slip control operation, in many cases, it is advantageous to excite both relays A and B for a short period at first in order to accelerate the start-up of the motor 7 or rather of the motor-and-pump unit 5. Then, after a predetermined time, such as 100 msec to 500 msec, the relay A is turned off, so that the power is supplied to the motor 7 only via the series resistor $R_V$.

According to the present invention, the power limitation achieved by directing the motor supply current via the series resistor $R_V$ is cancelled in situations critical to safety and reliability caused, for example, by certain defects, by a drop in the battery voltage $U_B$, by particularly low outside temperatures and the like. For the embodiment of the invention illustrated, this occurs by actuating the motor relay A.

The necessary information is supplied to the control unit 8 via the inputs $E_m$, $E_n$, $E_p$ in order to recognize such situations critical to safety and reliability. This information is obtainable, for example, by means of equipment monitoring the voltage, by means of corresponding sensors and the like, with many arrangements being possible. One example of such equipment for monitoring the system for situations critical to safety and reliability includes a speed sensor 12. Sensor 12 measures the actual speed in rpm of the drive motor 7 and signals the control unit 8 a drop in the speed below a critical value, whereupon the control unit 8 will cancel the power limitation. Such a drop in the speed of the motor below a limit value can be caused by a particularly high load on the motor-and-pump unit, by an unusually low battery voltage $U_B$, by a defective contact b or by a defective auxiliary relay B to mention but a few examples.

Instead of using the contact configuration, inclusive of the series resistor $R_V$, the whole of which is marked by reference numeral 10, in FIG. 1 it is also possible, according to the present invention, to use a so-called semiconductor relay or an electronic relay or a switching transistor representing a controllable resistor. Such alternatives are represented in FIG. 1A by a block 10', including a variable resistor $R_V'$, and a signal line 11. In this case, the necessary control signals that likewise can be generated in the control unit 8 are supplied to the electronic relay 10' via signal line 11. Such an electronic motor relay, at present, is more expensive than the illustrated relay configuration 10 of FIG. 1. However, it has the advantage that, by controlling the resistor by means of a pulse sequence, it is possible to achieve a practically loss-free control of the motor 7. By means of such an electronic relay, it is also possible to adapt the power consumption, or rather the power limitation of the motor 7, with a much higher degree of precision and in several stages to the actual demand by modulating the actuating pulse sequence. In many cases, however, the described and represented two-stage actuation of the motor 7, or rather the speed reduction, by means of the insertion of the series resistor $R_V$ will be sufficient in order to achieve the desired objective, namely a sufficient reduction of the disturbing noises of the motor-and-pump unit 5. What is decisive is that the demanded operational reliability of the brake system will be kept up by monitoring and cancelling the power limitation in situations critical to safety and reliability. For critical situations, the principle of safety first before comfort holds.

We claim:

1. A hydraulic brake system with anti-lock control and traction slip control, with an electric-motor-driven hydraulic pump for auxiliary pressure supply during a controlled braking operation and during a traction slip control operation by means of brake management, with an electronic control unit for controlling the auxiliary pressure and for modulating or controlling the braking pressure in the wheel brakes of controlled wheels in dependence on the rotational behavior of the wheels and/or on signals representing predetermined operation of the brake system and of the electronic elements or pointing out malfunctions, characterized in that, during the traction slip control operation, the speed of the hydraulic pump is reduced by limiting the power consumption of a pump motor to a predetermined value where the noise development is small relative to the noise development with nominal capacity; and in that the electronic control unit cancels the power consumption limitation in situations critical to safety and reliability or in case of malfunctions of the control system.

2. A brake system as claimed in claim 1, characterized in that an ohmic resistor is inserted into an electric attachment of the pump motor in order to limit the power consumption, said resistor being bridged by the contact of a relay, controlled by the electronic control unit, in case of full power consumption.

3. A brake system as claimed in claim 1, characterized in that a controllable resistor is inserted into the electric attachment of the pump motor for the purpose of respectively controlling or limiting the power consumption of the pump motor, is actuatable by means of a pulse sequence generated by the electronic control unit.

4. A brake system as claimed in claim 3, characterized in that an electronic relay or a semiconductor relay, or a switching transistor is provided as the controllable resistor.

5. A brake system as claimed in claim 4 characterized in that, by modulating the pulse sequence which serves to actuate the controllable resistor, the electronic control unit adapts the power consumption of the motor of the hydraulic pump to the respective demand of the motor.

6. A brake system as claimed in claim 3 characterized in that, by modulating the pulse sequence which serves to actuate the controllable resistor, the electronic control unit adapts the power consumption of the motor of the hydraulic pump to the respective demand of the motor.

7. A brake system as claimed in claim 1, characterized in that the electronic control unit cancels the power limitation upon a drop in the supply voltage below a limit value.

8. A brake system as claimed in claim 1, characterized in that the electronic control unit monitors the control variation such as the rotational behavior of the wheels in order to detect situations critical to safety and reliability.

9. A brake system as claimed in claim 1, characterized in that the electronic control unit monitors the speed of the pump motor in order to detect situations critical to safety and reliability.

10. A brake system as claimed in claim 1, characterized in that the power limitation upon the turning-on of the hydraulic pump comes on after a predetermined time period such as of 100 msec to 500 msec.

11. A hydraulic brake system having anti-lock control and traction slip control for controlling a plurality of wheel brakes associated with a plurality of wheels of a vehicle, said brake system comprising:

first signal means for supplying a first set of signals representative of the rotational behavior of the wheels;

second signal means for supplying a second set of signals representative of proper operation of selected components of said brake system and of malfunctions of said selected components;

wheel brake control means for controlling pressure fluid flow to and from the wheel brakes;

an electric-motor-driven hydraulic pump for supplying auxiliary fluid pressure to said wheel brakes during an anti-lock control operation and during a traction slip control operation;

power control means for limiting power consumption by said electric-motor-driven hydraulic pump to reduce the speed of said electric-motor-driven hydraulic pump to a predetermined value at which noise development is small relative to noise development at nominal speed during traction slip control operation;

and electronic control means for developing:
(1) first control signals in response to said first set of signals for controlling:
 (a) said wheel brake control means and said electric-motor-driven hydraulic pump during anti-lock control operation, and
 (b) said wheel brake control means and said power control means during traction slip control operation, and
(2) second control signals in response to said second set of signals for controlling said power control means to cancel the power limitation in at least one of the following situations:
 (a) critical to safety,
 (b) critical to reliability, and
 (c) in case of malfunctions of any of said selected components of said brake system.

12. A brake system according to claim 11 wherein said power control means include an ohmic resistor and a relay controlled by said second control signals and having a contact bridging said ohmic resistor when closed in response to said second control signals.

13. A brake system according to claim 11 wherein said power control means include a controllable resistor controlled in response to said second control signals.

14. A brake system according to claim 13 wherein said controllable resistor is a semiconductor relay.

15. A brake system according to claim 14 wherein said semiconductor relay is actuated by a pulse sequence modulated by said electronic control means.

16. A brake system according to claim 13 wherein said controllable resistor is a switching transistor.

17. A brake system according to claim 16 wherein said switching transistor is actuated by a pulse sequence modulated by said electronic control means.

18. A brake system according to claim 13 wherein said controllable resistor is an electronic relay.

19. A brake system according to claim 18 wherein said electronic relay is actuated by a pulse sequence modulated by said electronic control means.

20. A brake system according to claim 13 wherein said controllable resistor is actuated by a pulse sequence modulated by said electronic control means.

21. A brake system according to claim 11 wherein said electronic control means cancels the power limitation upon a drop in the supply voltage below a limit value.

22. A brake system according to claim 11 wherein said electronic control means develops an indication of vehicle reference speed from said first set of signals representative of the rotational behavior of the wheels to detect situations critical to safety and reliability.

23. A brake system according to claim 11 wherein said electronic control means monitor the speed of said electric-motor-driven hydraulic pump to detect situations critical to safety and reliability.

24. A brake system according to claim 11 wherein actuation of said power control means to effect the power limitation upon said electric-motor-driven hydraulic pump is delayed a predetermined period of time.

25. A brake system according to claim 24 wherein said predetermined period of time is 100 msec to 500 msec.

* * * * *